Patented Jan. 13, 1953

2,625,527

UNITED STATES PATENT OFFICE 2,625,527

ALKYL ESTERS AND PLASTIC COMPOSITIONS COMPRISING SAME

Paul V. Smith, Jr., Westfield, and David W. Young, Roselle, N. J., assignors to Standard Oil Development Company, a corporation of Delaware No Drawing. Application May 4, 1949, Serial No. 91,424

1 Claim. (Cl. 260—31.8)

This invention relates to a new class of esters which have been discovered to be particularly effective as plasticizers for resins and rubber-like materials. In particular, this invention relates to certain non-volatile branched chain alkyl esters of polybasic acids such as certain octyl phthalates.

The ever expanding use of plastic materials such as vinyl chloride polymers or copolymers, polyvinyl acetate, cellulose esters, acrylate and methacrylate resins, rubbers such as the emulsion copolymers of butadiene with styrene or acrylonitrile, or the copolymers of isobutylene with small amounts of a diolefin such as isoprene have created a large demand for suitable plasticizers. Alkyl esters and particularly di-2-ethylhexyl phthalate, di-n-octyl phthalate and tri-2-ethylhexyl phosphate have been known to be satisfactory plasticizers for the aforementioned high molecular weight materials, but the supply of these plasticizers has been unable to keep pace with the expansion of the plastics industry, largely because of a shortage of alcohols suitable for the manufacture of desired esters.

It is the object of this invention to provide the art with a new source of esters of polybasic acids. Another object is to provide branched chain alkyl esters of improved plasticizing characteristics. Another object is the production of plastic compositions having superior physical and chemical properties. Still other objects will appear from the subsequent description.

It has now been discovered that new alkyl esters of polybasic acids, in which the alkyl groups predominantly contain 8 carbon atoms in a branched chain structure, can be prepared from certain novel monohydric aliphatic alcohol mixtures, and it has been discovered further that certain synthetic octyl alcohol mixtures give esters unexpectedly superior to comparable esters previously known.

The alcohol mixtures required for the present invention are best obtained by the "OXO" process. The term "OXO" process is understood in the art as referring to a process wherein an olefin feed is first reacted or "oxonated" with carbon monoxide and hydrogen at a temperature between 250 and 400° F. and under a pressure of about 150 to 400 atmospheres in the presence of a cobalt catalyst to form aldehydes in accordance with the following reaction.

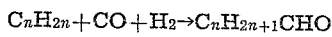

and the aldehydes are then catalytically hydrogenated to form the desired alcohols as follows:

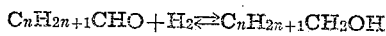

The preferred hydrogenation catalyst is nickel though other known hydrogenation catalysts such as the sulfides of nickel, molybdenum and cobalt, with or without support on carbon, silica, etc., can also be used, especially where a rugged catalyst is desired. The basic principles and operating conditions of the "OXO" process which can be used for making the desired alcohols are described, for example, in U. S. Patent 2,327,066 and elsewhere.

In discussing the OXO reaction of olefin hydrocarbons, it has been found convenient to classify the various olefins into five fundamental types according to the character of carbon atoms linked by the olefinic bonds. These five types are as follows:

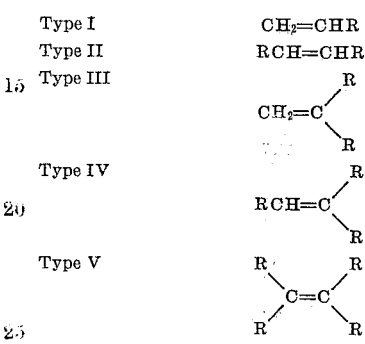

In the above formulas R represents a straight or a branched chain alkyl group, it being understood that where more than one symbol R appears in a formula, the several R symbols may represent the same alkyl group or different alkyl groups. Under this classification, for example, butene-1, 3-ethyl pentene-1, or 4,4-dimethyl pentene-1 are Type I olefins; butene-2, 4,4-dimethyl pentene-2, 2-methyl 5-ethyl hexene-3 are Type II olefins; 2,3,3-trimethyl butene-1 is a Type III olefin; 2,4-dimethyl pentene-2 is a Type IV olefin; tetra methyl ethylene is a Type V olefin; and so forth.

In the OXO reactions, generally, there is no invariable point of attack on the olefinic double bond such as one might predict from Markownikoff's rule, and thus in the case of Type I olefins of the formula $H_2C=CHCH_2R$ approximately equal amounts of both 1-substituted alcohols of the formula $CH_2OH.CH_2.CH_2.CH_2R$ and 2-substituted alcohols of the formula

are formed, with the 1-position being slightly favored. It is thus apparent that the OXO process is inherently committed to the production of at least some branched-chain primary alcohols even when the starting material is a pure Type I straight-chain olefin. Type V olefins are usually incapable of oxonation. The oxonation feed may contain mono-olefins of any type and suitable olefinic feeds may be fractionated, for example, from cracked gases, from Fischer-Tropsch synthesis products or from a polymerized stream of $C_3$ to $C_5$ olefins.

Particularly effective plasticizers can be prepared according to this invention from alcohols derived from a carefully fractionated C₇ cut. Such a C₇ cut can best be obtained by so-called U. O. P. polymerization of propylene or of an olefin mixture containing propylene and butenes. In the known U. O. P. process a C₃–C₄ feed is polymerized at temperatures between about 350 and 550° F. and at pressures of 100 to 500 pounds per square inch over phosphoric acid adsorbed on a carrier such as silica, as described, for example, by Sachanen on pages 58–60 of his book entitled "Conversion of Petroleum" (1940). For example, a typical feed used for preparing a C₇ cut useful for the purposes of the present invention contained 21.8% propylene, 2.9% isobutylene and 2.7% n-butylenes in addition to paraffinic hydrocarbons in the C₃ to C₄ range. Based on olefins the feed thus may contain about 80% or more of propylene, about 10% or less of isobutylene, and the balance being normal butylenes. A typical C₇ polymer cut resulting from such a feed had the following composition:

```
        C  C
        |  |
    C—C=C—C—C              20.6  (Gives no alcohol)
        C
        |
    C—C=C—C—C          ⎫
        C              ⎬   22.0
        |              ⎪
    C—C=C—C—C—C        ⎭
        C  C
        |  |
    C—C=C—C—C              13.7
           C
           |
    C—C=C—C—C—C             5.7
        C  C
        |  |
    C=C—C—C—C               5.2
        C  C
        |  |
    C=C—C—C                 4.7
           C
           |
    C—C=C—C—C—C        ⎫
           C           ⎬    3.0
           |           ⎪
    C—C—C=C—C—C        ⎭
        C  C
        |  |
    C—C=C—C                 2.6  (Gives no alcohol)
    C—C—C=C—C—C—C           2.3
        C
        |
    C=C—C—C—C—C             2.2
              C
              |
    C=C—C—C—C               2.1
              C
        C  C
        |  |
    C=C—C—C—C               1.9
    C—C=C—C—C—C—C           1.1
                          ─────
                           87.1  (Remainder unidentified)
```

The alcohols formed by oxonation of the olefinic materials described above are naturally quite complex in character and the exact composition of many of these products is not known. The C₈ OXO alcohols obtained from the propylene polymers described above have been found to comprise a mixture of isomers having, on the average, two alkyl side groups of one to three carbon atoms attached to a principal paraffinic chain of four to six carbon atoms. In other words the mixture of C₈ alcohols useful for the purposes of the present invention consists essentially of isomers having the formula $$\text{R.CH.CH.CH.CH}_2\text{OH}$$
$$\;\;\;\;\;|\;\;\;|\;\;\;|$$
$$\;\;\;\text{R}_3\;\text{R}_2\;\text{R}_1$$

wherein R stands for hydrogen, methyl or ethyl, R₁ stands for hydrogen, methyl or isopropyl, R₂ and R₃ stand for hydrogen, methyl, ethyl and isopropyl, and wherein R plus R₁ plus R₂ plus R₃ contain a total of four carbon atoms. The presence of 2-ethyl substituted alcohols such as 2-ethyl-3-methyl pentanol, 2-ethyl-4-methyl pentanol and/or others is insignificant, being limited to values not in excess of about 5% of the total alcohol mixture.

More particularly, the C₈ alcohol which is especially outstanding for the purposes of the present invention, and which will be referred to hereafter as an "oxanol" consists essentially of about:

25 to 40% of 2-methyl-3-ethyl pentanol-1 and 2-isopropyl pentanol-1
15 to 25% of 2-isopropyl-3-methyl butanol-1
5 to 10% of 2,5-dimethyl hexanol-1
5 to 10% of 3,4-dimethyl hexanol-1
5 to 10% of 3,4,4-trimethyl pentanol-1 the balance being other iso-octyl alcohols as yet unidentified, up to about 15% of C₉ alcohols, and up to about 15% of C₇ and lower alcohols. Some unreacted olefin, traces of aldehyde, acetal and ester may also be present. It is advantageous to wash the resulting mixture with a dilute aqueous solution of sodium hydroxide preferably at a moderate temperature, e. g. around 60° C.

One typical oxanol has been found to have the following characteristics:

Hydroxyl no. 412
Carbonyl no. 1
Saponification no. 0.5
Acid no. 0.0

A. S. T. M. distillations:

| | |
|---|---|
| 5% | 175.5° C. |
| 50% | 183.3° C. |
| 95% | 188.3° C. |
| Final | 202.7° C. |

(Recovery 99.0%)

Alcohol purity $$\left(\frac{\text{Hydroxyl No.}}{\text{Theor. Hydroxyl No. (431)}} \times 100\right) = 98\%$$

and kinematic viscosity at 68° F. 13.4–13.9 centistokes. In general it is desirable that the kinematic viscosity of the oxanol be between about 13.0 and 14.0 centistokes at 68° F.

A comparison of the properties of this oxanol with the conventional 2-ethylhexanol, and of the respective phthalic esters prepared therefrom in the usual known method, is given below:

| | Oxanol | 2-ethyl-hexanol |
|---|---|---|
| Specific gravity, 20/20 | 0.832–0.837 | 0.832–0.837 |
| Boiling range, ° C | 177–193 | 180–190 |
| Maximum acidity, weight percent as acetic acid | 0.01 | 0.01 |
| Maximum APHA color (Pt-Co scale) | 15 | 15 |
| Phthalic ester: | | |
| Maximum APHA color (Pt-Co scale, high temperature test) | 80 | 150 |
| Specific gravity, 20/20 | 0.986 | 0.986 |
| Acidity, weight percent as acetic acid | 0.002 | 0.01 |
| Ester value, percent | 99.7 | ¹97 |
| Power factor at: | | |
| 60 cycles, percent | 0.66 | 3.97 |
| 1000 cycles, percent | 0.04 | 0.23 |

¹ Minimum.

The superiority of the novel oxanol in terms of ester properties is particularly noticeable from a comparison of color, acidity and power factor. The favorable power factor of the oxanol phthalate has particularly significant practical implications since it is known that di-n-octyl phthalate has such a high power factor as to be useless in electrical insulation whereas di-2-ethylhexyl phthalate has a power factor which is only fair. It thus appears that increased branchiness of the alcohol radical has a beneficial effect on the power factor of the eventual phthalate ester.

Another useful alcohol mixture may be obtained by oxonation of diisobutylene and consists principally of 3,5,5-trimethyl hexanol-1. Esters prepared therefrom are also excellent plasticizers though for low temperature use, these esters are distinctly inferior to the previously described phthalate derived from oxanol.

Useful polyalkyl esters of the present invention prepared from the aforementioned $C_8$ OXO alcohols include phthalates, phosphates, adipates, azelates, sebacates, thiodipropionates and similar esters of dibasic or tribasic acids. These esters can be prepared by any of the conventional methods, as by reacting the alcohol with acid, or with acid anhydride, or with acid chloride or oxychloride, or by first transforming the alcohol into an alkyl halide and then reacting the latter with a metal salt of the selected acid. For example, phthalate esters may be prepared efficiently by reacting about 2 mols of a suitable alcohol with one mol of phthalic anhydride, without any catalyst or in the presence of sulfuric or preferably toluene sulfonic acid catalyst and using a solvent such as benzene as entrainer. Phosphate esters are usually prepared by reacting about three mols of alcohol with one mol of phosphorus oxychloride in the presence of a suitable medium such as benzene, preferably in the further presence of a basic substance such as pyridine to absorb the hydrogen chloride produced in the reaction. The invention does not rest in the process of making the new esters, but rather in the esters themselves which, due to the particular choice of alcohols used in their preparation, possess a superior and unexpected combination of properties. As described above, where particularly pure and colorless esters having good plasticizing action at low temperatures are desired, it is important first to subject the crude OXO alcohol to a distillation at pot temperatures preferably not exceeding about 240° C. and preferably with previous caustic treatment, to remove minor impurities such as aldehydes, acids, esters, acetals, unsaturated carbonyl compounds, etc. The larger the alcohol distillate recovery on distillation of a given crude OXO alcohol, the poorer the quality of the ester product prepared therefrom, and for best results the oxanol cut should correspond to a yield of about 50 to 70% based on the crude alcohol product.

EXAMPLE 1

A comparison of previously known esters with the esters of the invention shows that the latter have a substantially higher viscosity which makes them particularly valuable not only as non-bleeding plasticizers but also as lube oil additives and even as synthetic lubricants. The esters listed in this example were prepared by mixing 1 gram molecular weight of phthalic anhydride, 2.2 gram molecular weight of the alcohol, 0.5 weight percent of para-toluene sulfonic acid as catalyst and 150 to 200 ml. of toluene. The water was azeotroped off by heating, the remaining product washed with sodium carbonate and water, dried and stripped at 200° C. and a pressure of 5 mm. Hg to remove the unreacted alcohol. The viscosities of the several esters are summarized in Table I.

TABLE I

Kinematic viscosity

[in centistokes]

| Ester | 50° F. | 68° F. | 77° F. | 100° F. |
|---|---|---|---|---|
| Di-n-octyl phthalate | 65.3 | 38.4 | 30.2 | 17.7 |
| Di-2-ethylhexyl phthalate | 139.5 | 70.9 | 52.1 | 26.8 |
| Di-oxanol phthalate | 151.4 | 76.3 | 56.4 | 29.2 |

The oxanol phthalate shown in Table I was obtained from a closely fractionated oxanol of very low $C_9$ alcohol content and is particularly suited as a low temperature plasticizer. For this use it is desirable that the oxanol used in the esterification be sufficiently closely fractionated to give a phthalate having a kinematic viscosity not in excess of 85 centistrokes at 68° F., preferably between about 75 and 85 centistokes.

EXAMPLE 2

The effectiveness of the novel oxanol esters as plasticizers is shown in the runs evaluated in Table II wherein a commercial resinous copolymer of 95% vinyl chloride and 5% vinyl acetate, known as Vinylite VYNW and hereafter abbreviated as PVCA, and a commercial polyvinyl chloride resin known as Geon 101 and hereafter abbreviated as PVC, were chosen as illustrative materials. In preparing the test samples, 100 grams of the resin were dry-blended by hand with 3 grams of basic lead carbonate and 1.5 grams of stearic acid. Instead of the lead carbonate, 1 to 5 parts per 100 parts of resin of other basically reactive stabilizers could be used. The dry mixture was heated in a beaker with 50 grams of plasticizer and stirred to give a homogeneous blend whereupon the latter was charged to a 6 x 12 inch laboratory mill heated with steam to about 280 to 320° F. The resin was then fluxed about two minutes and allowed to mill with a rolling bank for five minutes with occasional cutting. Qualitative test indicated that different combinations of vinyl resins and plasticizer required somewhat different mill temperatures to obtain a good mix in 5 minutes. After mill mixing, the stock was sheeted off at 0.075 to 0.15 inch thickness.

In general, it was observed that the novel oxanol phthalate fluxes or solvates high molecular weight vinyl resins at the usual milling temperatures noticeably faster than similar octyl esters previously known. This is a very important factor since it has long been recognized that prolonged exposure of a vinyl resin stock to heat during processing or later has a permanent adverse effect on the stability and physical properties of such a stock. The improved fluxing properties of the novel plasticizers thus have a direct beneficial effect on the properties of the plasticized resin in that these plasticizers make it possible to reduce the total high temperature history of the resin stock.

The sheeted stock was then molded at 280° F. in a standard A. S. T. M. mold (D15-41) yielding slabs 6 x 6 x 0.075 inch. The molding cycle was 10 minutes at minimum ram pressure to allow free flow of the resin, followed by 10 minutes at 900 lbs./sq. in. The molded slabs were allowed to stand near 75° F. for at least one day before testing.

Tensile properties were determined in the usual manner on a Scott Tester (model L-3) at about 75° F. and 50% relative humidity, the rate of jaw separation being 20 inches per minute. Hardness was determined by using the Shore A Durometer, (ASTM D676-44T) and taking multiple readings on each specimen. Brittle temperature was determined as described under ASTM D746-44T. Stiffness index in pounds per square inch was measured by means of the tester described under ASTM D747-43T. Heat aging characteristics were measured in a hot air circulating oven designed to give reproducible results. The specimens tested were cut from molded slabs with die C (ASTM D412-41) and aged at 200° F.

Light aging was studied by placing

6″ x 6″ x 0.075″ pressed slabs under ultra violet light at 125° F. for 150 hours in a Fadeometer, and re-determining the physical properties of the exposed product.

The results obtained are summarized in Table II.

The results show that substantially identical tensile strength, ultimate elongation and hardness, were obtained regardless of the type of octyl phthalate used, while the brittle temperature was the same in the case of blends plasticized either with the oxanol phthalate or the 2-ethylhexyl phthalate, but lowest with n-octyl phthalate.

wise considered as one of the most desirable plasticizers for polyvinyl resins. While the n-octyl phthalate seems to be the least volatile of all, this advantage is largely offset by the relative unavailability of this material and consequently by its high cost. It has also been indicated hereinbefore that the use of n-octyl phthalate is objectionable in electrical insulation because of the extremely poor power factor of this normal ester.

Another most important advantage is apparent from a comparison of the light aging data. It can be seen that the exposed stock containing the oxanol phthalate suffered a reduction in tensile strength of only about 4.5% as compared with almost 8% for the stock plasticized with regular ethylhexyl phthalate while the corresponding reductions in elongation were about 11% and 17% respectively. Furthermore, in view of the fact that polyvinyl resins are finding an ever increasing outlet as curtain material, seat covers and for other uses in interior decoration where sunlight resistance is essential, it is of the utmost importance to observe that the stock plasticized with the novel oxanol phthalate remained virtually unchanged after exposure to ultra violet light whereas the stock containing conventional ethylhexyl phthalate showed numerous brown spots.

TABLE II

*Comparison of di-octyl phthalate plasticizers in vinyl resins*

| Stock No. | 1 | 2 | 3 | 4 | 5 | 6 |
|---|---|---|---|---|---|---|
| PVC | 100 | 100 | 100 | | | |
| PVCA | | | | 100 | 100 | 100 |
| Di-oxanol phthalate [1] | 50 | | | 50 | | |
| Di-2-ethylhexyl phthalate | | 50 | | | 50 | |
| Di-n-octyl phthalate | | | 50 | | | 50 |
| Basic lead carbonate | 3 | 3 | 3 | 3 | 3 | 3 |
| Stearic acid | 1.5 | 1.5 | 1.5 | 1.5 | 1.5 | 1.5 |
| Specific gravity | 1.254 | 1.259 | 1.252 | 1.255 | 1.256 | 1.255 |
| Tensile strength, pounds per square inch | 2,710 | 2,650 | 2,450 | 3,020 | 3,020 | 3,030 |
| 100% modulus, pounds per square inch | 1,890 | 1,640 | 1,490 | 1,750 | 1,780 | 1,720 |
| Ultimate elongation, percent | 240 | 230 | 260 | 280 | 240 | 240 |
| Shore hardness (instant) | 82 | 73 | 76 | 80 | 77 | 77 |
| Crescent tear at 75° F., pounds per linear inch | 510 | 430 | 430 | 490 | 450 | 440 |
| Tour-Marshall stiffness, pounds per square inch, at: | | | | | | |
| 75° F | 2,000 | 1,890 | 1,890 | 1,800 | 1,480 | 1,800 |
| 35° F | 18,050 | 13,360 | 10,000 | 16,460 | 13,180 | 9,000 |
| 5° F | 61,100 | 49,500 | 23,300 | 64,800 | 47,100 | 24,900 |
| −10° F | 118,500 | 96,500 | 51,800 | 125,200 | 94,100 | 57,500 |
| Bell telephone brittle temperature, ° F | −20 | −20 | −40 | −20 | −20 | −40 |
| Oven aged 4½ days at 250° F. (limited air circulation): | | | | | | |
| Tensile, lbs./sq. in | 3,590 | 4,730 | 2,940 | 3,630 | 5,050 | 3,350 |
| Ultimate elongation, percent | 70 | 40 | 170 | 100 | 20 | 170 |
| Aged 150 hours in ultraviolet light at 125° F.: | | | | | | |
| Tensile, lbs./sq. in | | | | 2,880 | 2,680 | |
| Ultimate elongation, percent | | | | 250 | 200 | |
| Shore hardness (instant) | | | | 77 | 81 | |
| Appearance | | | | (2) | (3) | |

[1] Kinematic viscosity 82.2 centistokes at 68° F.
[2] Substantially unchanged.
[3] Extensive brown spots.

On the other hand the oxanol phthalate has a significantly greater crescent tear strength than the plasticizers of the prior art. It is believed that this is still another phenomenon attributable to the highly branched character of the novel esters.

An important advantage of the particular esters of the invention is apparent from the heat aging data of Table II which show that the blends compounded with the novel oxanol phthalate had a much greater ultimate elongation after heat aging than the blends compounded with 2-ethylhexyl phthalate. These results indicate that the oxanol phthalate is substantially less volatile from polyvinyl resins under the severe test conditions used than the 2-ethylhexyl phthalate, which has been other-

EXAMPLE 3

Phthalate esters of limited usefulness can also be prepared from the mixture of branched nonyl alcohols derived by oxonation of diisobutylene or of a codimer of isobutylene and butene-1 or butene-2, and also from similar nonyl alcohol mixtures obtained by Fischer-Tropsch synthesis. This mixture of branched nonyl alcohols is hereafter referred to as iso-nonyl alcohol, in distinction from other nonyl alcohols known previously. The following data show a comparison of the dialkyl esters, prepared by reacting iso-nonyl alcohol with phthalic anhydride, with the conventional di-2-ethylhexyl phthalate, and also with the novel oxanol phthalate as plasticizers for polyvinyl resins or blends thereof with rubbery materials.

TABLE III

| Stock No. | 1 | 2 | 3 | 4 | 5 |
|---|---|---|---|---|---|
| Vinylite VYNW | 100 | 100 | 100 | 100 | 100 |
| Basic lead carbonate | 3 | 3 | 3 | 3 | 3 |
| Stearic lead | 1.5 | 1.5 | 1.5 | 1.5 | 1.5 |
| Di-iso-nonyl phthalate (Oxo) | 50 | | | | 50 |
| Di-iso-nonyl phthalate (Fischer) | | 50 | | | |
| Di-oxanol phthalate | | | 50 | | |
| Di-ethylhexyl phthalate | | | | 50 | |
| Diene-nitrile rubber [1] | | | | | 50 |
| Physical properties: | | | | | |
| Specific gravity | 1.243 | 1.243 | 1.255 | 1.256 | 1.166 |
| Tensile, p. s. i. | 2,920 | 2,630 | 3,020 | 3,020 | 1,950 |
| 100% modulus, p. s. i. | 2,100 | 1,230 | 1,750 | 1,789 | 540 |
| Elongation, percent | 220 | 260 | 280 | 240 | 460 |
| Bell telephone brittle temp., °F | −10 | −10 | −20 | −20 | −40 |
| Crescent tear at 25° C., pounds per inch | 510 | 515 | 490 | 450 | 270 |
| Shore hardness (instant) | 87 | 90 | 80 | 77 | 67 |

[1] Emulsion copolymer of 65 parts butadiene and 35 parts acrylonitrile; Mooney viscosity 90.

The above data were obtained according to the procedures described in Example 2 and show that the iso-nonyl esters are substantially as effective plasticizers for polyvinyl resins as the other alkyl esters tested, the only material difference being a substantially higher brittle point which makes the iso-nonyl esters unsuited for uses requiring low-temperature flexibility. However, this drawback can be overcome in many instances and further modification of the final product properties may be achieved by blending into the stock an auxiliary plasticizing material, either of the ester type or of the rubbery polymer type. The effect of the latter is shown in Stock 5 whence it is seen that the addition of butadiene-acrylonitrile rubber effects a very substantial lowering in brittle temperature accompanied by a decrease in tensile strength and a substantial increase in elongation.

EXAMPLE 4

The novel oxanol phthalate ester is also an effective plasticizer for rubber-like compositions as shown from Table IV wherein the novel plasticizer is compared with conventional ethylhexyl phthalate in vulcanized compounds of butadiene-acrylonitrile rubber.

TABLE IV

*Comparison of di-octyl phthalate plasticizers in rubber compounds*

| Stock No. | 1 | 2 | 3 | 4 | 5 | 6 |
|---|---|---|---|---|---|---|
| Synthetic rubber [1] | 100 | 100 | 75 | 75 | 75 | 75 |
| PVCA [3] | | | 25 | 25 | 100 | 100 |
| Litharge | | | 2.5 | 2.5 | 2.5 | 2.5 |
| Zinc oxide | 5 | 5 | | | | |
| Stearic acid | 1 | 1 | 1 | 1 | 3 | 3 |
| Carbon black (thermax) | 150 | 150 | 150 | 150 | 5 | 5 |
| Benzothiazyl disulfide | 1 | 1 | 1 | 1 | 1.5 | 1.5 |
| Sulfur | 1.5 | 1.5 | 1.5 | 1.5 | 1.5 | 1.5 |
| Di-2-ethylhexyl phthalate | 40 | | 40 | | 40 | |
| Di-oxanol phthalate [2] | | 40 | | 40 | | 40 |
| Physical properties for cure time, 30' at 287° F.: | | | | | | |
| Specific gravity | 1.309 | 1.306 | 1.162 | 1.161 | 1.367 | 1.368 |
| Tensile, lbs./sq. in. | 1,220 | 1,310 | 2,110 | 2,220 | 1,340 | 1,440 |
| 100% modulus, lbs./sq. in. | 100 | 100 | 570 | 630 | 320 | 380 |
| 200% modulus, lbs./sq. in. | 200 | 240 | 1,020 | 1,380 | 680 | 700 |
| 300% modulus, lbs./sq. in. | 420 | 520 | 1,570 | 1,720 | 920 | 940 |
| Ultimate elongation, percent | 790 | 820 | 380 | 410 | 570 | 590 |
| Shore hardness (instant) | 41 | 42 | 64 | 64 | 60 | 62 |
| Volume increase after 1 day at 75° F.: A. S. T. M. fuel No. 2, percent | 29.6 | 28.0 | 33.2 | 34.5 | 18.9 | 19.4 |
| Volume increase after 6 days at 75° F.: A. S. T. M. fuel No. 2, percent | 27.8 | 26.0 | 25.0 | 25.7 | 18.8 | 18.9 |
| Bell telephone brittle temperature, °F | −60 | −60 | −60 | −60 | −50 | −50 |

[1] An emulsion copolymer of 74 parts butadiene and 26 parts acrylonitrile; Mooney viscosity 60.
[2] Kinematic viscosity 81.3 centistokes at 68° F.
[3] Resinous copolymer of 95% vinyl chloride + 5% vinyl acetate (Vinylite VYNW).

It will be observed from the above table that the compounds comprising the oxanol phthalate consistently have higher tensile strength, higher elongation and higher modulus than the compounds comprising 2-ethylhexyl phthalate while the brittle temperatures of the comparable compounds are equivalent. This difference in properties is apparently due to the more branched character and/or to the somewhat higher viscosity of the oxanol ester. The increased modulus observed in the 75/25 rubber/vinyl resin blend containing the oxanol ester is particularly noteworthy and represents a highly desirable improvement of this rubber-like compound, it being noted that the modulus has been increased without reducing the ultimate elongation of the compound.

EXAMPLE 5

Apart from the phthalate esters, oxanol can also be used to formulate effective phosphate esters as shown in Table V.

TABLE V

*Comparison of tri-octyl phosphate plasticizers in rubber compounds*

| Stock No. | 1 | 2 | 3 | 4 | 5 | 6 |
|---|---|---|---|---|---|---|
| Synthetic rubber [1] | 75 | 75 | | | 75 | 75 |
| Synthetic rubber [2] | | | 75 | 75 | | |
| PVCA | 100 | 100 | 100 | 100 | 25 | 25 |
| Litharge | 2.5 | 2.5 | 2.5 | 2.5 | 2.5 | 2.5 |
| Stearic acid | 2 | 2 | 2 | 2 | 1 | 1 |
| Carbon black (Thermax) | 5 | 5 | 5 | 5 | 150 | 150 |
| Benzothiazyl disulfide | 1.5 | 1.5 | 1.5 | 1.5 | 1 | 1 |
| Sulfur | 1.5 | 1.5 | 1.5 | 1.5 | 1.5 | 1.5 |
| Tri-2-ethylhexyl phosphate | 40 | | 40 | | 40 | |
| Tri $C_9$ Oxo alcohol phosphate | | 40 | | 40 | | 40 |
| Physical properties for cure time 30' at 287° F.: | | | | | | |
| Specific gravity | 1.146 | 1.144 | 1.154 | 1.155 | 1.330 | 1.332 |
| Tensile, lbs./sq. in. | 1,800 | 1,770 | 2,290 | 2,270 | 1,390 | 1,440 |
| 100% modulus, lbs./sq. in. | 670 | 670 | 420 | 400 | 520 | 540 |
| 200% modulus, lbs./sq. in. | 1,450 | 1,480 | 1,010 | 980 | 1,100 | 1,130 |
| 300% modulus, lbs./sq. in. | | | 1,610 | 1,550 | 1,320 | 1,310 |
| Ultimate elongation, percent | 270 | 280 | 390 | 420 | 290 | 330 |
| Shore hardness (instant) | 60 | 59 | 56 | 55 | 59 | 57 |
| Crescent tear at 75° F., lbs./sq. in. | 180 | 190 | 200 | 210 | 200 | 210 |
| Increase after 1 day at 75° F., A. S. T. M. fuel No. 2, vol. percent | 28.2 | 27.2 | 5.56 | 5.42 | 16.7 | 16.0 |
| Increase after 6 days at 75° F., A. S. T. M. fuel No. 2, vol. percent | 20.9 | 20.9 | 17.2 | 18.6 | 14.8 | 14.3 |
| Increase after 12 days at 75° F., A. S. T. M. fuel No. 2, vol. percent | 19.0 | 18.8 | 9.8 | 10.8 | 11.2 | 11.2 |
| Bell telephone brittle temperature, °F | −80 | −70 | −70 | −70 | −70 | −70 |

[1] Emulsion copolymer of 74 parts butadiene and 26 parts acrylonitrile; Mooney viscosity 60.
[2] Emulsion copolymer of 65 parts butadiene and 35 parts acrylonitrile; Mooney viscosity 90.

The above results show that stocks containing the novel phosphate ester have favorable low temperature properties, are resistant to the solvent action of gasoline and are consistently more extensible.

EXAMPLE 6

Very effective plasticizers may also be formulated from esters of the synthetic iso-alcohols with thiodipropionic acid. This acid is easily prepared by adding hydrogen sulfide to two mols of acrylonitrile according to the following equation:

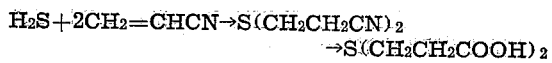

Alternatively, the desired esters may be prepared by reacting the corresponding acrylic acid ester with hydrogen sulfide:

The particular esters tested were prepared by reacting thiodipropionic acid with a mixture of branched, saturated aliphatic nonyl and decyl OXO alcohols respectively, the alcohols themselves having been obtained by oxonation of suitable hydrocarbon synthesis olefins. The resulting esters were blended with Vinylite VYNW (PVCA) on a micro rubber mill at 280° F., and good blending was obtained in either case within 6 minutes. The material, a rubber-like plastic, was then removed from the mill, pressed into a test slab at 300° F. and evaluated for tensile strength, modulus and ultimate elongation. Comparative determinations were made with two standard plasticizers, namely di-2-ethylhexyl phthalate and tri-2-ethylhexyl phosphate. The results are summarized in Table VII.

TABLE VII

| Compound No. | 1 | 2 | 3 | 4 | 5 |
|---|---|---|---|---|---|
| PVCA | 100 | 100 | 100 | 100 | 100 |
| Basic PbCO₃ | 3 | 3 | 3 | 3 | 3 |
| Stearic acid | 1.5 | 1.5 | 1.5 | 1.5 | 1.5 |
| $S(CH_2CH_2COO-C_{10}H_{21})_2$ | | 50 | | | |
| $S(CH_2CH_2COO-C_9H_{19})_2$ | | | 50 | | |
| Di-2-ethylhexyl phthalate | | | | 50 | |
| Tri-2-ethylhexyl phosphate | | | | | 50 |
| Tensile, lbs./sq. in | 3,100 | 3,110 | 2,608 | 3,490 | 2,600 |
| 100% modulus | | 1,897 | 2,270 | 2,310 | 1,870 |
| Ultimate elongation, percent | | 260 | 150 | 210 | 180 |

Run 1 in the above table shows that in the absence of a plasticizer polyvinyl resins do not possess elastic properties, as is well known.

Runs 2–5 show that the novel thiodipropionic esters are not only satisfactory substitutes for standard esters known previously, but the thiodipropionic ester obtained from the decyl alcohol proved to be substantially better than either of the ethyl hexyl esters in that the former caused a substantially greater elongation.

EXAMPLE 7

Diglycollic acid also gives good plasticizers when esterified with various OXO alcohols. For example, when diglycollic acid was reacted with a $C_8$ OXO alcohol as well as a $C_{11}$ OXO alcohol, light colored esters with very slight odor were formed. When the resulting two esters were compounded on a rubber mill in a vinyl chloride-acetate copolymer (Vinylite VYNW), elastic compounds having the following properties were obtained after molding in accordance with the procedure described in Example 2 above:

| Formula | A | B | C |
|---|---|---|---|
| Vinyl resin, g | 100 | 100 | 100 |
| C₈ Oxo alcohol diglycolate, g | 50 | | |
| C₁₁ Oxo alcohol diglycolate, g | | 50 | |
| Di-2-ethylhexyl phthalate | | | 50 |
| Basic lead carbonate, g | 3 | 3 | 3 |
| Stearic acid, g | 1.5 | 1.5 | 1.5 |
| Mixing time, min | 10 | 10 | 10 |
| Mill temperature, °F | 310 | 310 | 310 |
| Properties: | | | |
| Tensile, lbs./sq. in | 2,930 | 2,860 | 3,020 |
| 100% modulus, lbs./sq. in | 2,660 | 2,660 | 1,780 |
| Ultimate elongation, percent | 360 | 340 | 240 |
| Shore hardness (instant) | 80 | 90 | 77 |
| Tour-Marshall stiffness at +5° F., lbs./sq. in | 28,920 | 37,600 | 47,100 |
| Bell telephone brittle temp., °F.: | | | |
| O. K. at | −20 | −30 | −20 |
| Broke at | −30 | −40 | −30 |
| Oven aging—6 days at 250° F. tensile strength, lbs./sq. in | 2,890 | 2,430 | |
| Ultimate elongation, percent | 0 | 140 | |
| Shore hardness (instant) | 81 | 86 | |
| Shore hardness (5 seconds) | 78 | 82 | |

It is to be observed from the above data that the two OXO alcohol diglycolate esters were effective plasticizers for the vinyl resin. In particular, the compound containing the $C_{11}$ diglycolate is seen to have a brittle temperature 10° F. lower than the compound containing ethylhexyl phthalate. The heat aging resistance of the $C_{11}$ diglycolate compound as reflected by elongation after aging is likewise remarkable. The suitability of the diglycolate esters for high temperature uses is undoubtedly due, in part at least, to the high boiling point of these compounds. Thus the $C_8$ OXO alcohol ester of diglycollic acid cannot be distilled even at 250° C. and 3 mm. Hg.

Another important feature of the esters used in this example is their surprisingly low pour point. For example, whereas the n-decyl ester of diglycollic acid has a pour point of +80° F., both OXO alcohol esters used in this example had pour points below −35° F. It appears that these unusually low pour points of the OXO esters are due to the fact that the OXO alcohols used in the preparation contain considerable branching and inherently consist of a large variety of isomers. In any event, the resulting low pour points are highly desirable when the esters are used as plasticizers.

In summary, the novel invention relates to novel branched chain alkyl esters of polybasic acids such as phthalic, phosphoric, maleic, sebacic, adipic, aconitic, thiodipropionic, diglycollic and the like wherein the aliphatic alcohol used in the esterification reaction has 7 to 11 carbon atoms per molecule and is a mixture of isomers derived by oxonation of $C_6$ to $C_{10}$ olefins. Particularly unexpected results can be obtained in accordance with the present invention by using esters of phthalic acid or anhydride esterified with an octyl alcohol derived by oxonation of a heptylene feed obtained by the U. O. P. polymerization of a $C_3$–$C_4$ olefin cut as plasticizers for various polymeric materials. Furthermore, instead of esterifying the acid with the OXO alcohol directly, it may be advantageous to react the alcohol first with ethylene oxide to form an ether alcohol such as $C_8H_{17}OCH_2.CH_2OH$ and forming an ester from this ether alcohol, e. g. by reaction with phosphoric oxychloride.

In particular, the invention relates to plasticized resin compositions containing the novel esters as plasticizers, usually in proportions ranging from about 5 to 100 parts or preferably 30 to 60 parts per 100 parts of resin. Polymeric materials which lend themselves to successful plasticization with the esters of the invention include the various vinyl resins such as polyvinyl chloride, polyvinyl acetate, polyvinyl alcohol, mixed polymers of vinyl chloride with vinyl acetate, or vinylidene chloride, polyvinyl butyral or other polyvinyl acetals; nitrocellulose, ethyl cellulose; rubber-like polymers of diolefinic materials such as butadiene-nitrile (GR–A), butadiene-styrene (GR–S) or polychloroprene elastomers, or isobutylene-diolefin copolymers of the GR–I type, or other polymeric materials customarily requiring plasticization. Mixtures of these classes of materials may be used, such as a mixture of 100 parts by weight of vinyl chloride resin with 10 to 300 parts by weight of butadiene-acrylonitrile synthetic rubber of 15 to 40% nitrile. It will be understood, of course, that in addition to the plasticizer, the polymer compositions may also contain conventional stabilizers such as basic lead carbonate, sodium borate or the like, oleic acid, auxiliary plasticizers or softeners, fillers, pigments and eventually also curing agents, when the polymer is of the curable type.

It will be understood further that the foregoing examples have been given merely for purposes of illustration, but that other modifications of the present invention are possible without departing from the scope of the appended claim.

The invention is particularly defined and claimed as follows:

A composition of matter comprising 100 parts of a resinous copolymer of 95% vinyl chloride and 5% of vinyl acetate, 30 to 60 parts of a neutral ester of phthalic acid esterified with a mixture of branched chain primary aliphatic alcohols obtained by hydrogenating the product obtained by reacting a mixture of C–7 olefins with carbon monoxide and hydrogen at a temperature between 250 and 470° F. and pressures between 150 and 400 atmospheres, consisting essentially of 25 to 40% of 2-methyl-3 ethyl pentanol-1 and 2-isopropyl-pentanol-1, 15 to 25% of 2-isopropyl-3-methyl butanol-1, 5 to 10% of 2,5-dimethyl hexanol-1, 5 to 10% of 3,4-dimethyl hexanol-1, 5 to 10% of 3,4,4-trimethyl pentanol-1, 0 to 15% of $C_9$ alcohols and 0 to 15% of $C_7$ alcohols.

PAUL V. SMITH, Jr.
DAVID W. YOUNG.

REFERENCES CITED

The following references are of record in the file of this patent:

UNITED STATES PATENTS

| Number | Name | Date |
|---|---|---|
| 2,015,077 | Lawson | Sept. 24, 1935 |
| 2,015,088 | Reid | Sept. 24, 1935 |
| 2,166,934 | Tuttle | July 25, 1939 |
| 2,301,867 | Gresham | Nov. 10, 1942 |
| 2,311,259 | Staff | Feb. 16, 1943 |
| 2,325,951 | Gresham | Aug. 3, 1943 |
| 2,517,351 | Reid | Aug. 1, 1950 |

OTHER REFERENCES

Hackhs Chemical Dictionary, page 607, 3rd Edition, published 1944, The Blakiston Co., Philadelphia.

Page 260–4 (October 1949) No. 200 Classification Bulletin of the United States Patent Office Class 260 Chemistry, Carbon Compounds Sept. 1949.